United States Patent [19]

Strutz

[11] 3,917,948
[45] Nov. 4, 1975

[54] DEVICE FOR MEASURING THE DOSE OF ULTRAVIOLET RADIATION IN THE ERYTHEM-EFFECTIVE RANGE

[75] Inventor: Ernst Strutz, Zurich, Switzerland

[73] Assignee: Biviator S.A., Grenchen, Switzerland

[22] Filed: Feb. 7, 1974

[21] Appl. No.: 440,579

[30] Foreign Application Priority Data

Sept. 18, 1973 Germany............................ 2346917

[52] U.S. Cl. ............................................. 250/372
[51] Int. Cl.² ........................................ G01J 1/42
[58] Field of Search .................................... 250/372

[56] References Cited
UNITED STATES PATENTS

| | | |
|---|---|---|
| 3,427,489 | 2/1969 | Walsh ............................ 250/372 X |
| 3,662,175 | 5/1972 | Davidson et al. ................ 250/372 X |
| 3,710,115 | 1/1973 | Jubb ................................. 250/372 |

*Primary Examiner*—Archie R. Borchelt
*Attorney, Agent, or Firm*—Imirie, Smiley & Linn

[57] ABSTRACT

This invention relates to a device for measuring the radiation dose of natural and artificial irradiation, in particular in the erythemal-effective range of UV-radiation, this device containing an opto-electric analog-to-digital converter and a pulse counter being designed such that different intensities are continuously integrated during a determined period and that the sum of the integrated intensities is evaluated. The device works on one hand as a measuring instrument and on the other hand as an indicator if a predetermined dose is reached, signalling optically or acoustically this event and or shutting off the radiator.

14 Claims, 3 Drawing Figures

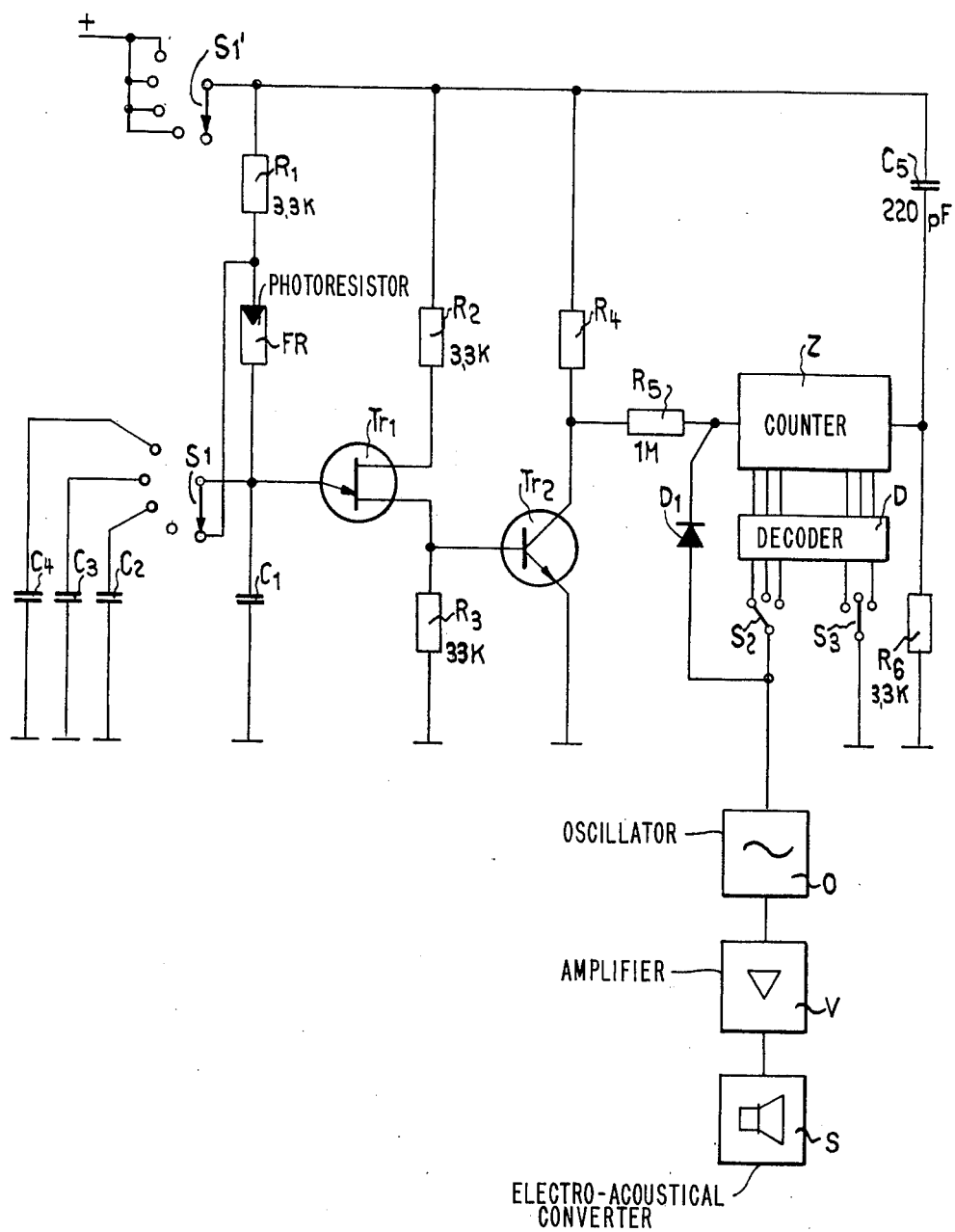

DEVICE FOR MEASURING THE DOSE OF ULTRAVIOLET RADIATION IN THE ERYTHEM-EFFECTIVE RANGE

BACKGROUND OF THE INVENTION

The present invention relates to a device for measuring the radiation dose of natural and artificial radiation, in particular of ultra-violet radiation in the erythem-effective range, advantageously provide an indication when reaching the erythem-threshold or a part thereof which depends on the individual compatibility of the UV-B-radiation range.

In medicine frequently ray therapy is used for causing specific successful treatments. These kinds of irradiations are used too, for instance, when controlling drying processes. Sunbathing also is such an irradiation.

The above irradiations have in common that for their effect the intensity of radiation and the duration of irradiation plays an important part. The effects of the irradiation are furthermore dependent upon the kind of radiations, that is, their wavelength.

It is known that only a very small range of wavelengths can be perceived by the eyes, between about 380 nm and 780 nm. The range between 100 nm and 1,000,000 nm is called the optical range. By international conventions the range between 100 nm and 380 nm is called the ultra-violet on UV-range, and the range between 780 nm and 1,000,000 nm is called the infrared on IR-range. Departing from the visible range there is the UV-A range between 315 nm and 380 nm, the ultra-violet range UV-B between 280 nm and 315 nm, and the ultra-violet range UV-C between 100 nm and 280. Further, there is the infrared range IR-A between 780 nm and 1,400 nm, the infrared range IR-B between 1,400 nm and 3,000 nm, and the infrared range IR-C between 3,000 nm and 1,000,000 nm.

There exist devices measuring the transient intensity of radiation. However, those devices are not capable for controlling the dosage, for example for measuring the already administered dose or for indicating reaching of the allowed or best suited dose. As long as the intensity of the radiation remains constant during irradiation, which is more or less true for artificial radiators, the duration or irradiation can be taken from a table, which contains the dosage as product of the intensity and the time. This table is practically useless if the intensity and nature of the radiation is fluctuating. For example the sun as a natural radiator is continually fluctuating during the day, due to the influence of many factors, such as clouds.

For measuring the UV-radiation when applied to organic substances, in particular to human skin, it has to be mentioned that the skin reacts particularly strong on radiation in the UV-B range. The erythem, that is the skin-reddening which appears often only hours later is provoked from radiation below 320 nm, whose maximum lies in the UV-B raange. The direct pigmentation occurs through radiation in the UV-A range. Besides these facts, the sensitivity of the skin of individual persons is not the same. This depends not only on the particular person but also if it is the first, second, third or successive irradiation day. A table which accounts for the mentioned conditions for determining the duration of the irradiation by measuring the intensity is expensive and only usable by specially trained persons and includes various sources of errors, mentioned above, adding to the difficulties relating to the changing intensity during irradiation.

From "Strahlentherapie, Archiv fur klinische und experimentelle Radiologie", separate print 136/4, 1968, Urban & Schwarzenberg, Munich-Berlin-Vienna, a radiation measuring method is known, using the resist-method, where the change of the color of coated substrates is a measure of the dosage. This method is applicable for the total-UV observation of the sun on cloudless days or for similar longtime observations, but not for measuring the radiation dosage in solaria or UV-radiation devices.

A measuring instrument for the determination of the radiation power in the UV-range is known from a communication from the Institute for Physical Electronic, University of Stuttgart, Germany, Hans Albrecht and Eberhard Wagner, September 1973, with two photoelectric receivers behind a common filter, transmitting the radiation in the UV-A and UV-B range. Such filters transmit also parts of the IR-A range which are produced by thermal radiators, which can lead to erroneous measurements. With a long-edge-filter in front of one of the two receivers the UV-B range is securely blocked out, so that it receives beside the disturbing IR-A part which falls on both receivers, only the UV-A parts, whereas the other receives parts of both ranges UV-A and UV-B. By a subsequent subtraction all parts received in common and therewith also the disturbing IR-A parts are eliminated, and only the parts of the UV-B range are thus determined. But with this device too the measuring of the dosage over the irradiation time is not possible.

From K. Adler "UV-B Strahlungsmessung auf Halbleiterbasis mit konstanter spektraler Empfindlichkeit und deren Relation zu naturlichen und kunstlichen UV-B und Auswertung fur die Erythemschwellendosis", Grenchen, Switzerland, 1973 a device for measuring the UV-radiation is already known in which the different effect of the parts in the UV-A and UV-B range on human skin is accounted for.

This is important for the rating of the irradiation dose because the parts in the UV-B range of natural radiation are dependent on the altitude above sea level, contrary to the artificial radiation, so that it is not possible to measure everywhere with the same measuring cell. This so called "ozon-dependent UV-radiation" which furthermore is influenced by changes in the atmosphere or by the height of the sun, contains the parts in the UV-B range which are harmful for persons, and which, besides causing the well known sunburn to tourists, sportsmen and persons sunbathing at home, causes a still greater number of after-effects by the provocation of latent infections, medicamentous allergies, vegetative disturbances, prematured skin-aging, and skin-disease or even skin-cancer. At high UV-dosages harmful effects arise which can be avoided by limiting the duration of irradiation to the erythem-threshold-time.

The known instrument is designed thus that not only does it discriminate between natural and artificial radiation but also according to the skin-sensitivity of the person to be irradiated. Thus the erythem-threshold-time can be evaluated for persons with different skin-sensitivity and for natural and artificial radiation. To this end tables are necessary for determining the duration of irradiation from the transient intensity.

In the DT-OS 2,300,213 a device is described with which the transient intensity can be measured, but not the dosage, which can only be determined by continuous measuring, that is as a sum of the intensity radiated during a determined time lapse. On the input side of this instrument there is an opto-electric analog working converter followed by an analog working amplifier which transmits the signal proportional to the intensity of the radiation to a following reading instrument, measuring the instantaneous intensity. Thus it is not only possible to obtain the instant intensity value but it is also possible, when a determined threshold was preset and exceeded to drive an electrical signal-device to produce a signal or to shut-off the radiation source. This device needs a linearly operating amplifier which is sensitive to many influences due to its high gain, this resulting in a certain lability in the lower measuring range. With this instrument, only the transient UV-B intensity, which is the sum of the arriving UV-B lines, is measured by its integrated circuit and not the intensity relative to the accumulated dose.

SUMMARY OF THE INVENTION

One object of the present invention is to eliminate the influences which act negatively on the stability of the known instrument and, by computing the dose automatically, saving the user the trouble of converting the displayed transient values with the aid of tables.

One particular object of the invention is to record in integrated form different intensities during a determined time and to evaluate the sum of the integrated intensities, that is the irradiation dose.

The invention therefore aims at measuring continuously the intensitiy of natural and artificial radiators, in particular of ultra-violet light in the erythem-effective range, in order to determine the total administered dose, respectively to indicate the reaching of a programmed dose, evaluating this indication with a signal of shut-off function.

This goal is reached with a device containing an opto-electric analog-to-digital converter and a pulse counter, wherein said opto-electric analog-to-digital converter converts the respective intensity of the radiation into a pulse train having a pulse repetition frequency proportional to it and wherein a pulse counter counts the number of pulses corresponding to the product of radiation intensity with the irradiation time, said counter displaying the results of the counts in a manner so, that different intensities during a period are continuously integrable and that the sum of the integrated intensities is evaluable.

By this the test results are digitalized and can be integrated easily during a determined period. If thereby all counter positions are displayed, the device works as a measuring instrument for the indication of the dose administered during this time; but if on the other hand only one determined position of the counter is displayed, which corresponds to a determined and to be reached dose, it can be optically or acoustically indicated that this dose is reached or the radiator can be turned off in a known manner. Thus the device can, as a preferred embodiment, be used to indicate a determined dose, in particular to indicate the reaching of the erythem-threshold or a part of it, which depends on the individual compatibility of the UV-B range. The device according to the invention measures not the intensity of the radiation at a certain moment (Lux) but the amount of a continuous UV-B radiation (Lumen) which is brought in relation to the value of the erythem-threshold in the human body.

Advantageously the photo-electric analog-to-digital converter consists of a filter disposed at the input side, followed by a photo-electric converter, which is followed by an electric analog-to-digital converter.

In another development of an embodiment the pulse counter can be preset at the input and/or at the output side in a well known way. With such pulse counters it is possible to vary the positions of the counters in order to account for the proper different erythem-sensitivity of the individual persons respectively depending on the day of radiation and the different effects of natural and artificial radiation. In a further development the counter can have several outputs, indicating the respective counting position in coded form. With that it is possible to use a simple binary counter which is commercially available as integrated construction unit. In this case it is possible to tap the indicating pulse selectively from one or several outputs of the pulse counter and to supply it to a following signal apparatus and/or switching device. This has the advantage that the different signallings for the alarming signal and the switching off as protection can be realized and different thresholds, selectively depending from the erythem-sensitivity relative to natural or aritificial UV-B radiation can be determined, which thresholds are adjustable successively with corresponding switches.

Additional possibilities of discrimination result, if in a further modification of the invention the analog-to-digital converter is an oscillator, which, at least during the measurement, continuously produces pulses at a pulse repetition frequency proportional to the applied analog pulse. Such oscillators may be relatively simple RC-oscillators and can easily be stabilized against fluctuations of the operating voltage and the ambient temperature, this being particularly important with portable instruments for the dosage of sun irradiation. If, with a further development, the pulse repetition frequency is stepwise variable, an additional and relatively simple possibility is given to preset the device in dependence of the irradiation sensitivity, in particular of the irradiation sensitivity of the human skin, depending on the day of irradiation.

In a still further development aa particularly simple and reliable photo-electric converter results by the use of a photoresistor.

In another development the indicating pulse can activate an alarm signal generator and/or disconnect the radiator. It is known to build these signal generators as double oscillators which send out an interrupted call signal, for example with a relation of 1 : 2 of tone and interval. The indication can be given also with a continuous tone or a continuous optical signal. With the aid of a small relay or a similarly working electronic circuit the operating voltage for the radiator by artificial irradiation can be switched off.

If the counter has an output which indicates its respective counter position in coded form, a following decoding device is necessary which can consist in a known form of logic circuits and which, as further development of the invention, converts the reaching of at least one counter position in an indicating pulse.

This decoding device may include commutating means, enabling a range selection according to the individual erythem sensitivity of persons and/or relative to the different nature of the radiation.

If the counter in a further embodiment displays its respective counter position optically, an additional possibility to observe continuously the meter position and thus the already administered dose is given.

If the pulse counter, dependent on the body sensitivity and/or on the nature of radiation and/or the irradiation sensitivity which depends on the respective day of irradiation, can be preset separately, there results a simple device where, with the aid of three switches, all necessary presets can be effectuated. According to another characteristic of the invention a filter, matching the nature of the radiation is mounted behind a window, which limits the irradiation-measuring surface. The photoelectric converter, advantageously a photoresistor is mounted behind the filter, resulting in a cost-saving mechanical construction.

In order to record safely the inclined rays too, the window can in a further development be covered on the front side with a facet-glass. It is also possible to provide the filter at its font-side with facets.

In the following, the invention will be explained with the aid of drawings, showing by way of example a preferred embodiment.

BRIEF DESCRIPTION OF THE DRAWINGS

FIG. 3 shows the circuit of the arrangement according to FIG. 2.

DESCRIPTION OF THE PREFERRED EMBODIMENT

Figure 1:
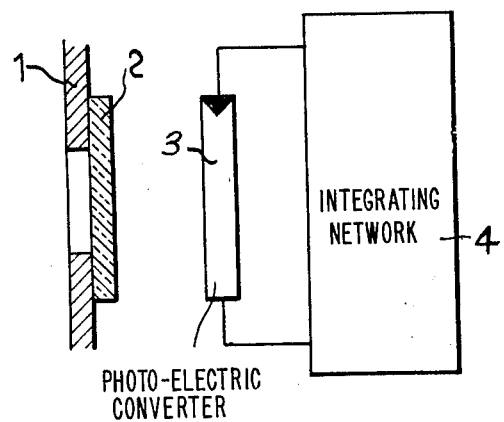
FIG. 1 shows schematically an arrangement for the measure and control of UV-irradiations according to the present invention.

Considering the arrangement of FIG. 1 the radiation incident from the left passes through a window 1 and reaches a filter 2 where only the erythem-efficient parts of the UV-B pass and fall on the photo-electric converter 3, the other parts of the radiation being absorbed by the filter. The converter 3 converts the radiation into electric pulses. By appropriate dimensionning of the window 1, the filter 2, and the converter 3, the value of the electric signal at the output of converter 3 varies according to the intensity of the UV-B part of the radiation. The electric circuit 4 integrates the electric pulses.

Figure 2:
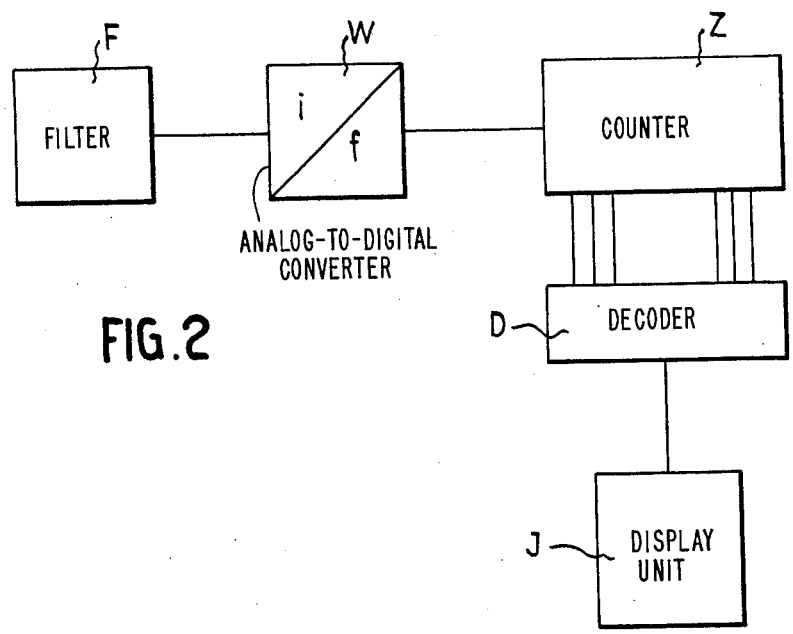
FIG. 2 is a block diagram of the separate functional parts of the arrangement according to FIG. 1.

From FIG. 2 it can be seen that the radiation which has been transmitted by filter F is converted in converter W said to a pulse train having a pulse repetition frequency F proportional to the intensity $i$ of the radiation. At high intensities more pulses are counter Z, which is connected to the output of the conventer, during a determined period than at low intensities. Thus the counter Z which is advanced by the pulses during the irradiation time forms the integral of the intensity of the UV-B radiation. Each counting position of the counter Z corresponds to a determined dose, which can be read directly. In order to indicate a determined counting position it is necessary to connect this position with a signal generator, which is controlled by the position.

The shown counter Z is a binary counter, of which the counting positions are determined by binary coded signals. To decode such signals, a decoder D is provided, transmitting the output signal corresponding to a determined counting position, respectively to a determined radiation dose, to a display unit J signalling the reaching of a predetermined counting position. The signalling can occur optically or acoustically and can also be used for switching off the radiator.

The arrangement shown in FIG. 3 contains the whole photo-electric analog-to-digital converter with its principal details, whereas the counter Z and the decoder D are shown only schematically. The photoresistor FR is an analog converter having a value of resistance changing proportionally to the intensity of the radiation and which is connected in series with a resistor R1 and disposed within the frequency-determining part of a generator, its frequency thus varying proportional to the intensity of the radiation (frequency modulation). In this part are further a capacitor C1 which is always connected into the circuit and capacitors C2–C4 which can be added selectively by the switch S1, which, in the first position can also shunt FR for calibrating the instrument.

The active switching element is a UJT or unijunction transistor Tr1 connected in series with resistor R2 and R3 between the poles of an operating voltage source, switched-on by a switch S1'. The output signal of the generator, being generated at the resistor R3 is converted by a following transistor into pulses advancing the counter Z. The pulse converter consists of a transistor Tr2 and a resistor R4, from which the pulses are transmitted over a following resistor R5 to the counter Z.

The switch S1' is mechanically coupled with switch S1 in such a manner that first switch S1' is closed and then the capacitors C2, C3 or C4 respectively are connected in parallel to capacitor C1.

By switching-on switch S1' a charging current flows to the capacitor C1, which is charged over the resistors R1 and FR until the transistor Tr1 becomes conducting. Now the capacitor C1 discharges over the transistor Tr1 and the resistor R3. The high potential at the resistor R3 results in making the transistor Tr2 conducting such that a negative voltage peak appears at its collector. With the decrease of the discharge current of the capacitor C1, the potential at the resistor R3 diminishes also and inversely the collector-potential of the transistor Tr2 increases. Thus, the sawtooth voltage generated from the generator is inverted by the pulse counter and transmitted to the input of the counter Z.

The pulse repetition frequency of these counting pulses is relatively high since only the capacitor C1 is effective so far, which capacity has to be very small. Consequently the counter Z is very fastly counted through and gives off a driving pulse to an oscillator O, over the decoder D and a switch S2, connected to one of its output. The oscillator begins to oscillate and generates a call signal, during advantageously one half second alternating with an interval of one second. This signal arrives after an appropriate amplification in amplifier V to an electro-acoustical converter S, converting it into an audible signal. This signal indicates the correct working of the device.

The counter Z is stopped by a diode D1, as this diode supplies to the input of the counter such a high potential that the negative counting pulses arriving over a high-ohmic resistance R5 are not effective.

Now at the first, second, third and at each following irradiation day switch S1 is brought to that position, in which the capacitor C2, C3 or, C4, respectively, is coupled in lies parallel to the capacitor C1. The above described processes now take place with a decreased pulse repetition frequency each day, as the capacity of each of the capacitors C2, C3, and C4 is relatively high. It takes a longer time until the counter Z has reached its respective highest counting position, selectable by switch S2. This switch S2 serves to select such counting positions which correspond to the different skin sensitivities of the persons to be irradiated at equal intensity. The decoder D is further switchable by a switch S3, so that it decodes another group of counting positions at switch S3 for natural irradiation than for artificial irradiation.

In this example the counter Z is a 14-stage binary counter, its outputs which are corresponding to the reaching of the erythem-threshold being selectable dependent on the erythem-sensitivity of the person to be irradiated and on the kind of radiation.

The invention is not restricted to the described embodiment. Another counter can be used in the same manner, and the switching can be effectuated otherwise. Further, instead of a sawtooth generator another alternating voltage generator can be used. If the counter is switchable at the input and/or output side a presetting can be effectuated instead of the frequency determination by the capacitors C2—C2. The corresponding applies for the setting of the counting positions relative to the erythem-sensitivity of the person to be irradiated and relative to the kind of radiation. The counter can be self-indicating, so that the administered dose can be read all the time. It can be constructed such that its counting position need not be decoded. The display unit can be optical or acoustical or drive a switching circuit.

The scope of the invention encompasses modification where for reasons of simplification, the device is changed so as to measure transient UV-B intensity by connecting a frequency meter to the output of the described oscillator.

What is claimed is:

1. A device for measuring the radiation dose of both natural and artificial ultra violet radiation in the erythem-effective wavelength range of 280–315 nm, comprising an optical filter for passing radiation in said range, oscillator means directly responsive to radiation passed by said filter for generating a pulse train having a pulse repetition frequency proportional to the instantaneous intensity of said filtered radiation, a pulse counter counting the number of pulses corresponding to the product of radiation intensity with the irradiation time, and means coupled to said pulse counter for evaluating the sum of the accumulated pulses.

2. A device according to claim 1, wherein said oscillator means has a frequency determining network including a photo resistor.

3. A device according to claim 1, wherein the pulse counter has means for presetting said counter to provide an output signal in response to a predetermined input count.

4. A device according to claim 2 wherein said frequency determining network includes capacitance means connected with said photo resistor.

5. A device according to claim 4 wherein said capacitance means is stepwise variable to cause a stepwise decrease in the frequency of said oscillator so as to preadjust the device for changes in irradiation sensitivity of individuals after each successive daily dose.

6. A device according to claim 5 wherein said capacitance means comprises a plurality of capacitors selectively interconnected with said photoresistor by a switch.

7. A device according to claim 2 wherein said oscillator means comprises a unijunction transistor coupled to said frequency determining network.

8. A device according to claim 1 further including a pulse forming network coupled between said oscillator and said pulse counter, said pulse forming network including a solid-state switching device.

9. A device according to claim 3 wherein said pulse counter comprises a binary counter connected to a decoding network having a plurality of outputs each representing a different set of radiation sensitivity characteristics.

10. A device according to claim 9 wherein said presetting means comprises switch means coupled between said decoding network and said evaluating means for selecting one of said plurality of outputs of said decoding network.

11. A device according to claim 10 wherein said presetting means comprises a second switch means connected with said decoding network for selectively placing the same in a first mode for natural radiation and a second mode for artificial radiation.

12. A device according to claim 1 wherein said evaluating means comprises a signal generator for providing a warning in response to said accumulated sum reaching a preselected count.

13. A device according to claim 12 wherein said signal generator is an audio tone generator.

14. A device according to claim 12 wherein said signal generator is a display unit.

* * * * *